(12) United States Patent
Shimizu (10) Patent No.: US 7,936,152 B2
(45) Date of Patent: May 3, 2011

(54) SWITCHING POWER SOURCE (75) Inventor: Hideo Shimizu, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 449 days.

(21) Appl. No.: 12/216,547

(22) Filed: Jul. 7, 2008

(65) Prior Publication Data
US 2009/0016087 A1 Jan. 15, 2009

(30) Foreign Application Priority Data

Jul. 9, 2007 (JP) .............................. PA 2007-179472
Mar. 26, 2008 (JP) .............................. PA 2008-079789

(51) Int. Cl.
*G05F 1/656* (2006.01)
(52) U.S. Cl. ................. 323/222; 323/284; 363/124
(58) Field of Classification Search .................. 323/222, 323/224, 284–288, 901, 207, 266; 363/34, 363/37, 123, 124, 89, 95
See application file for complete search history.

(56) References Cited

U.S. PATENT DOCUMENTS

| | | | | |
|---|---|---|---|---|
| 5,453,921 A | * | 9/1995 | Shutts | 363/21.18 |
| 6,069,458 A | * | 5/2000 | Takehara et al. | 315/307 |
| 6,130,528 A | * | 10/2000 | Aoyama | 323/282 |
| 6,215,290 B1 | * | 4/2001 | Yang et al. | 323/282 |
| 6,737,845 B2 | * | 5/2004 | Hwang | 323/284 |
| 7,072,191 B2 | * | 7/2006 | Nakao et al. | 363/21.1 |
| 2005/0068796 A1 | | 3/2005 | Morita | |

FOREIGN PATENT DOCUMENTS

| | | |
|---|---|---|
| JP | 04-168975 A | 6/1992 |
| JP | 11-069787 A | 3/1999 |
| JP | 2005-110434 A | 4/2005 |
| JP | 2005-229792 A | 8/2005 |
| JP | 2007-143383 A | 6/2007 |

* cited by examiner

*Primary Examiner* — Rajnikant B Patel
(74) *Attorney, Agent, or Firm* — Rabin & Berdo, PC (57) ABSTRACT

An error voltage Verr, as amplified by an amplifier, and an input voltage Vin, are multiplied together by a multiplier to generate a first threshold value signal Vth1, which is in phase with and similar in waveform to the input voltage Vin, and proportional in amplitude to the error voltage Verr. A second threshold value signal Vth2 is generated from the first threshold value signal Vth1 by a series circuit of a diode and a resistor. The power factor is increased by on/off-control of a switching element via a drive circuit, so that a current detection signal Vi, which is detected by a resistor and corresponds to an input current, falls between the two threshold value signals Vth1 and Vth2. Since the off time is not fixed, the noise spectrum is spread and increase of the switching frequency is suppressed. Noise reduction thus can be attained.

10 Claims, 13 Drawing Sheets

FIG. 14A INPUT VOLTAGE: LOW

FIG. 14B INPUT VOLTAGE: HIGH

SWITCHING POWER SOURCE

BACKGROUND OF THE INVENTION

1. Field of the Invention

The present invention relates to a switching power source in which the power factor is increased by producing a stable DC power source from an AC power source and operating so that an input voltage and an input current of a chopper circuit are approximately in phase and have similar waveforms.

2. Description of the Related Art

Among the control methods for switching power sources of the above kind are a critical-mode control method in which control is made so that a switching element is turned on when a coil current becomes zero and a continuous-current-mode control method in which control is made so that a coil current does not become zero. In general, the critical-mode control method is advantageous for the purpose of noise reduction, as switching occurs when the coil current becomes zero, and hence switching noise is low. However, its application to uses with a heavy load is difficult because large current ripples occur and hence much stress is imposed on a coil and a diode.

On the other hand, the continuous-current-mode control method can be applied to heavy-load uses by virtue of small current ripples and low stress on a coil and a diode, though the switching noise is larger than in the critical-mode control method. Generally available control ICs operate only in the critical mode or the continuous current mode. Therefore, it is necessary to use different control ICs depending on the load. This increases the development cost because, for example, the design of a power source system needs to be modified.

Figure 11:
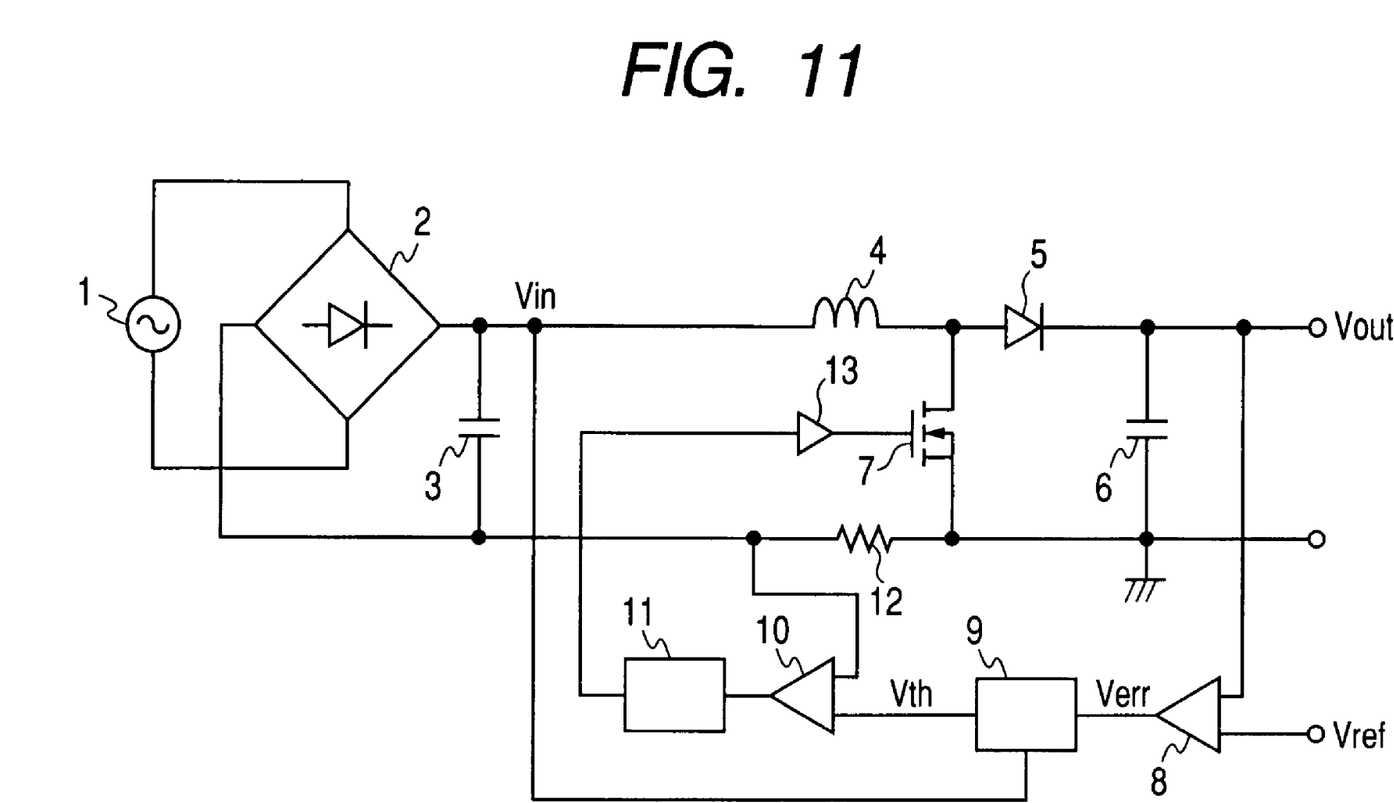
FIG. 11 shows the configuration of a conventional switching power source of a continuous-current-mode control type.

FIG. 11 shows an exemplary switching power source of the continuous-current-mode control type that is disclosed, for example, in JP-A-04-168975. In FIG. 11, reference numeral 1 denotes an AC power source; 2, a rectification circuit; 3 and 6, capacitors; 4, an inductor; 5, a diode; 7, a switching element such as a MOSFET; 8, a voltage error amplifier; 9, a multiplier; 10, a comparator; 11, a monostable multivibrator; 12, a current detection resistor; and 13, a drive circuit.

An output voltage of the AC power source 1 is full-wave-rectified by the rectification circuit 2, which is a diode bridge. High frequency noise is removed from a rectified voltage by the capacitor 3 (input voltage Vin), and a current is supplied to the capacitor 6 via the inductor 4 and the diode 5, whereby a smoothed DC voltage Vout is obtained. The switching element 7 is connected to the connecting point of the inductor 4 and the diode 5, and when turned on shunts the current flowing from the inductor 4 to the diode 5.

The voltage error amplifier 8 amplifies an error of the output voltage Vout with respect to a reference voltage Vref and gives an amplified error voltage Verr to the multiplier 9. The multiplier 9 multiplies the error voltage Verr and the input voltage Vin together, whereby a threshold value signal Vth is generated which is in phase with and similar, in waveform, to the input voltage Vin and is proportional, in amplitude, to the error voltage Verr. On the other hand, the current flowing through the inductor 4 is converted by the current detection resistor 12 to a current detection signal Vi, which is compared with the threshold value signal Vth by the comparator 10. An output of the comparator 10 is input to the trigger input terminal of the monostable multivibrator 11. The output of the monostable multivibrator 11 is kept at a low level for a prescribed time from input of a trigger signal and is thereafter changed to a high level. The output of the monostable multivibrator 11 is input to the drive circuit 13. The drive circuit 13 turns on the switching element 7 when its input turns to the high level, and turns off the switching element 7 when its input turns to the low level.

With the above configuration, when the switching element 7 is turned on, the current flowing through the inductor 4 increases and the current detection signal Vi rises. When the current detection signal Vi exceeds the threshold value signal Vth, the output of the comparator 10 turns to the high level. A trigger signal is input to the monostable multivibrator 11 and its output turns to the low level, whereby the switching element 7 is turned off via the drive circuit 13. The current coming from the inductor 4 decreases gradually. Since the low-level period of the monostable multivibrator 11 is set so that the current flowing through the inductor 4 does not become zero, the output of the monostable multivibrator 11 turns to the high level and the switching element 7 is turned on via the drive circuit 13 when the current has decreased to some extent.

Figure 12A:
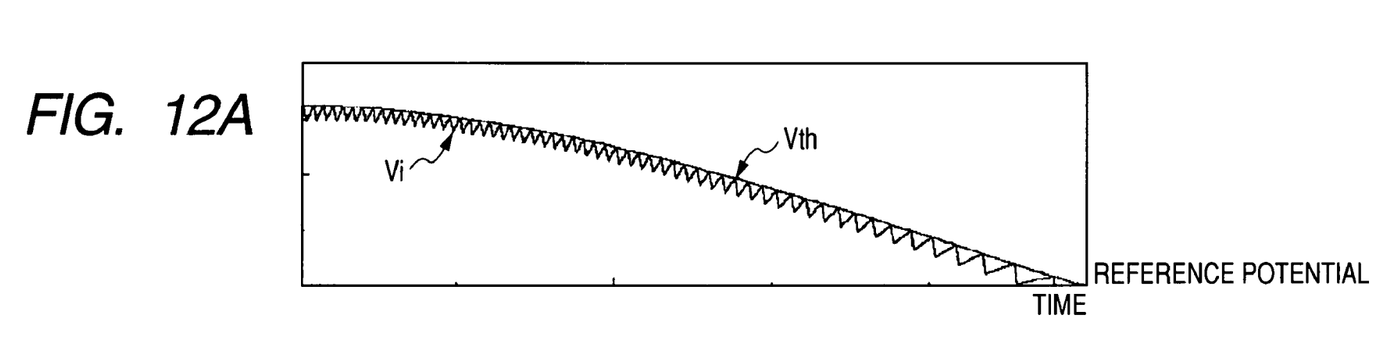
FIGS. 12A and 12B illustrate an operation of the conventional switching power source of FIG. 11.
Figure 12B:
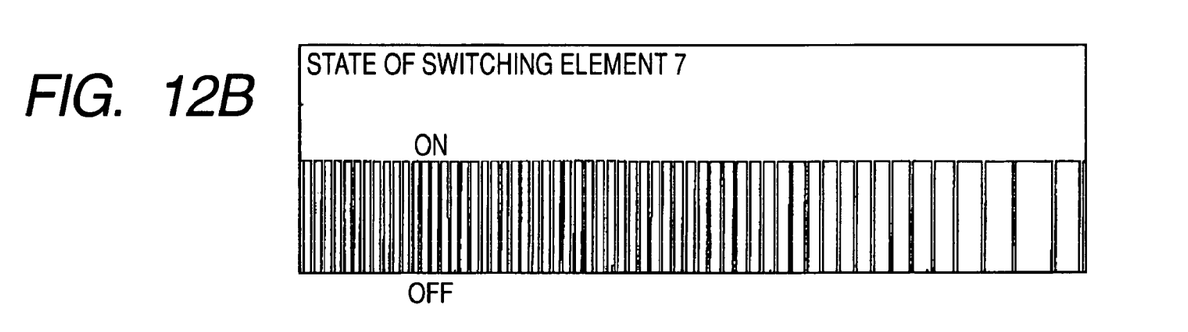

FIGS. 12A and 12B illustrate the above operation in which control is made so that peaks of the current detection signal Vi (which corresponds to the current flowing through the inductor 4) coincide with the threshold value signal Vth which is in phase with and similar, in waveform, to the input voltage Vin. Since the on time is variable and the off time is fixed, the switching frequency varies and the frequency of generated noise also varies. As a result, the noise spectrum is spread and noise reduction is enabled. FIG. 12A illustrates a relationship between the threshold value signal Vth and the current detection signal Vi, and FIG. 12B shows an on/off waveform of the switching element 7.

To increase the power factor, it is necessary to make an input current in phase with and similar, in waveform, to an input voltage. To this end, it is necessary to vary the on duty cycle broadly from 0% to a value close to 100%. A voltage developing across the inductor when the input voltage is of a 100 V system is different from that when the input voltage is of a 200 V system. In addition, the voltage across the inductor always varies even in each cycle of an AC input voltage. Therefore, the time constant (di/dt) of a current flowing through the inductor varies greatly. As a result, the current variation in a fixed time varies greatly depending on the value and the phase of an input voltage and the load state. Therefore, if the off time is fixed as in the above conventional example, the current variation becomes excessive or insufficient. This means a problem that the power factor cannot be increased beyond a certain limit. In the critical-mode control method, the switching element needs to be turned on when the current becomes zero. The critical-mode control is difficult in the case where the off time is fixed as in the above conventional example.

A method known as a measure against the above problems is disclosed in JP-A-2007-143383. This reference proposes a power factor increasing method in which a second threshold value signal Vth2 is provided which is proportional to a first threshold value signal Vth1. A switching element is turned off when a voltage corresponding to a current flowing through an inductor reaches the first threshold value signal Vth1, and is turned on when the voltage becomes lower than the second threshold value signal Vth2. According to this method, neither the on time nor the off time is fixed and the switching element can be turned on and off automatically with optimum timing in accordance with the input voltage state and the load state. The power factor can thus be increased.

Figure 13A:
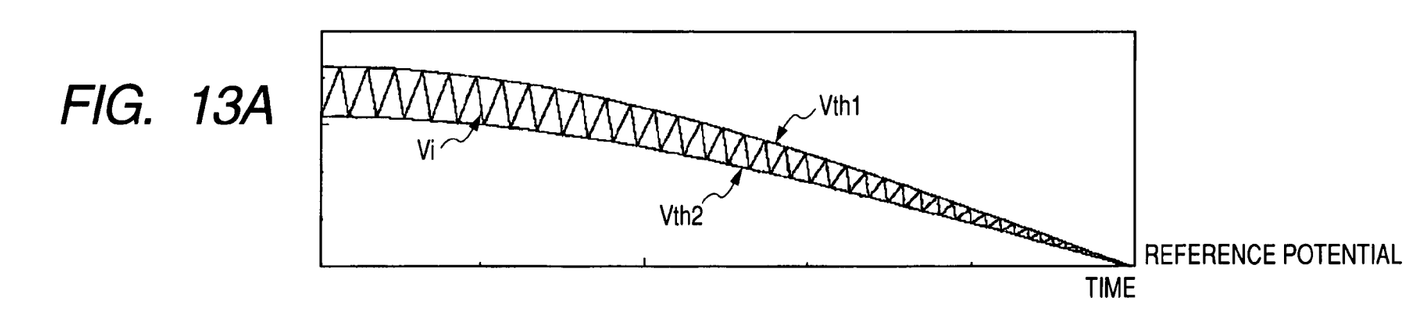
FIGS. 13A and 13B and FIGS. 14A and 14B illustrate other kinds of operations.
Figure 13B:
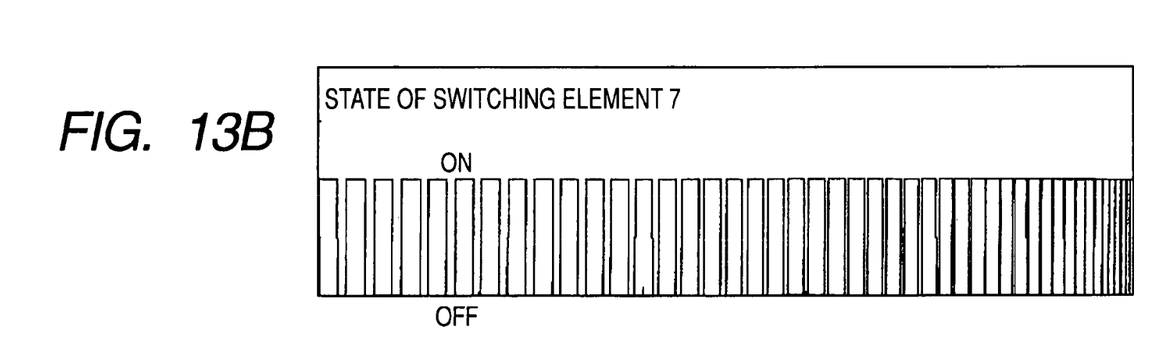
Figure 14A:
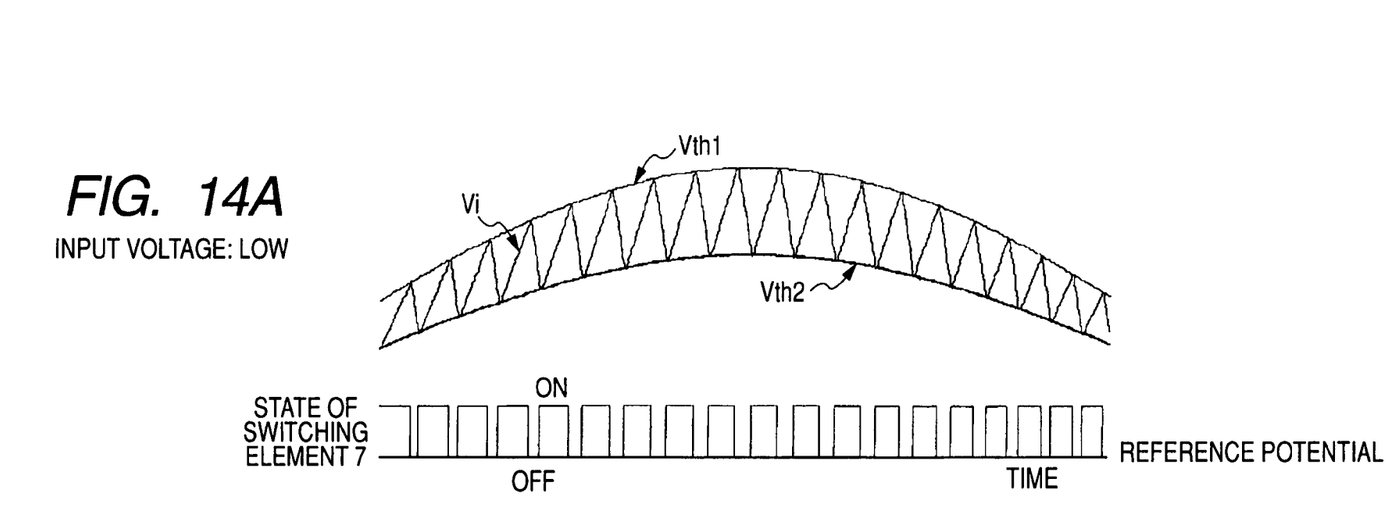
Figure 14B:
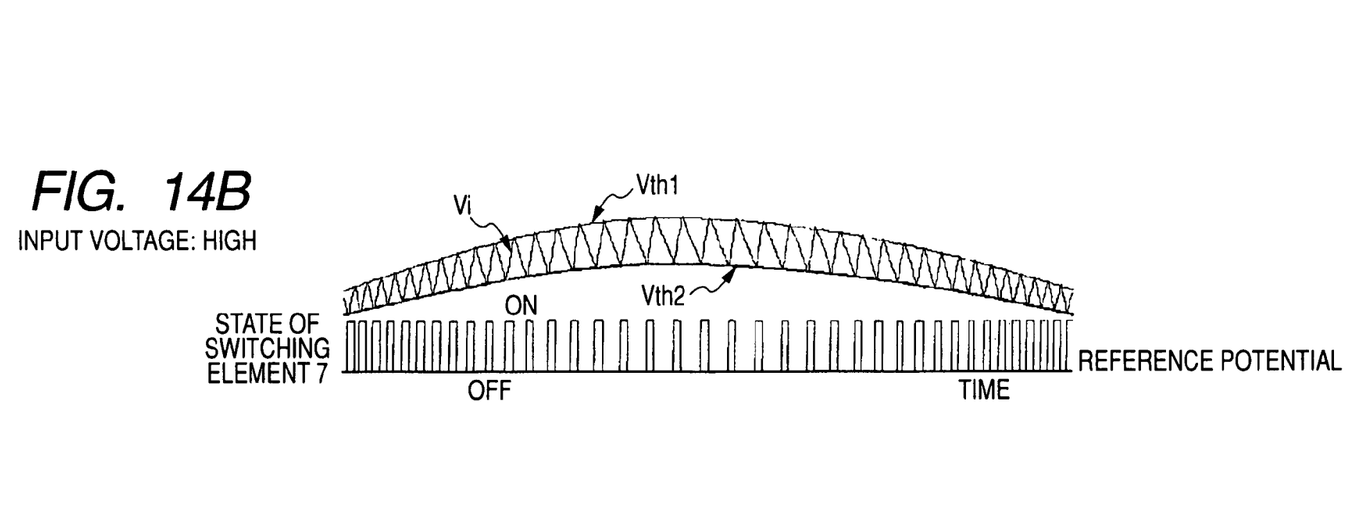

FIGS. 13A and 13B show an exemplary control method according to JP-A-2007-143383. As shown in FIGS. 13A and 13B, where the second threshold value signal Vth2 varies in proportion to the first threshold value signal Vth1, the input voltage Vin which is a full-wave-rectified voltage of an AC power source voltage varies with time and accordingly the first threshold value signal Vth1 varies between a reference potential and a peak potential. When the first threshold value signal Vth1 is around the reference potential, the second threshold value signal Vth2 is also small and the difference between the first threshold value signal Vth1 and the second threshold value signal Vth2 is small. The amplitude of the coil current becomes small and the switching frequency becomes very high, resulting in a problem that noise and switching loss are increased. FIG. 13A illustrates a relationship among the first and second threshold value signals Vth1 and Vth2 and the current detection signal Vi. FIG. 13B shows an on/off waveform of the switching element.

Where the ratio of the second threshold value signal Vth2 to the first threshold value signal Vth1 is fixed at a prescribed value, the difference between the first threshold value signal Vth1 and the second threshold value signal Vth2 is small (see FIG. 14B) when the average current flowing through the inductor is small because of an input voltage and a load condition. In this case, the switching frequency is high, resulting in a problem that noise and switching loss are increased. FIG. 14A shows a case that the difference between the first threshold value signal Vth1 and the second threshold value signal Vth2 is relatively large.

SUMMARY OF THE INVENTION

An object of the present invention is therefore to increase the power factor by reducing noise and loss, in particular, by reducing noise and loss by suppressing increase of the switching frequency. Another object of the invention is to simplify a power source system and thereby decrease its development cost by enabling easy switching between a critical-mode control method and a continuous-current-mode control method.

To attain the above objects, a first aspect of the invention provides a switching power source that includes a rectification circuit for producing a pulsating output by full-wave-rectifying an AC power source voltage. A chopper circuit of the switching power source includes a switching element for shunting, when on, a current flowing through an inductor which is connected to the rectification circuit, and a capacitor for producing a DC output by smoothing a current supplied from the inductor. A first signal generator generates a first threshold value signal which is in phase with and similar, in waveform, to an input voltage of the chopper circuit, and is proportional, in amplitude, to an error of an output voltage of the chopper circuit. A second signal generator generates a second threshold value signal approximately proportional in amplitude to the first threshold value signal. A current detector detects the current flowing through the inductor. A switching controller turns off the switching element when a current detection value of the current detector reaches a level of the first threshold value signal. The current detector turns on the switching element when the current detection value becomes lower than a level of the second threshold voltage signal.

The switching power source according to the first aspect of the invention may be such that the second signal generator is a series circuit of a diode and a first resistor to which the first threshold value signal and a reference potential are applied, respectively, or a series circuit of a first resistor and a parallel circuit of a diode and another resistor, the first threshold value signal and the reference potential being applied to the first resistor and the parallel circuit, respectively, and an output at a connecting point of the first resistor and the diode or the parallel circuit serves as the second threshold value signal. Alternatively, the switching power source may be such that the second signal generator is a series circuit of a resistor and a variable resistor to which the first threshold value signal and a reference potential are applied, respectively. An output at a connecting point of the resistor and the variable resistor serves as the second threshold value signal. The variable resistor may be such that it includes at least one series circuit of a resistor and a transistor, and the transistor is driven by at least one of the input voltage, the current flowing through the inductor, and the output voltage error. Alternatively, the variable resistor may be such that it includes at least one series circuit of a resistor and a switch or a parallel circuit of plural series circuits of a resistor and a switch, and the switch is turned on and off by at least one of the input voltage, the current flowing through the inductor, and the output voltage error.

According to a second aspect of the invention a switching power source includes a rectification circuit for producing a pulsating output by full-wave-rectifying an AC power source voltage. A chopper circuit includes a switching element for shunting, when on, a current flowing through an inductor which is connected to the rectification circuit and a capacitor for producing a DC output by smoothing a current supplied from the inductor. A first signal generator generates a first threshold value signal which is in phase with and similar, in waveform, to an input voltage of the chopper circuit and is proportional, in amplitude, to an error of an output voltage of the chopper circuit. A second signal generator generates a second threshold value signal which is proportional to the first threshold value signal. A modulator modulates the second threshold value signal. A current detector detects the current flowing through the inductor. A switching controller turns off the switching element when a current detection value of the current detector reaches a level of the first threshold value signal, and turns on the switching element when the current detection value becomes lower than a level of the second threshold voltage signal.

The switching power source according to the second aspect of the invention may be such that the second signal generator is a series circuit of a first resistor and a second resistor to which the first threshold value signal and a reference potential are applied, respectively, and an output at a connecting point of the first resistor and the second resistor serves as the second threshold value signal. The modulator may include a transistor to which the second threshold value signal and a reference potential are applied and a drive circuit for driving the transistor on the basis of the first threshold value signal. Alternatively, the modulator may include a transistor to which the second threshold value signal and a reference potential are applied and a drive circuit for driving the transistor on the basis of a difference between the first threshold value signal and the second threshold value signal. As a further alternative, the modulator may include a transistor to which the second threshold value signal and a reference potential are applied and a drive circuit for driving the transistor on the basis of a difference between the first threshold value signal and a control signal.

According to the invention, the switching element is on/off-controlled so that a current detection signal which corresponds to a current flowing through the inductor falls between two threshold value signals which are in phase with and similar, in waveform, to an input voltage and are proportional, in amplitude, to an error voltage signal. As a result, neither the on time nor the off time are fixed, and the switching element can be turned on and off automatically with optimum timing according to the input voltage state and the load state. The power factor can thus be increased. The switching frequency varies as the on time and the off time vary, and the spectrum of generated noise is spread. Noise reduction is thus enabled. Furthermore, when the threshold value signals come close to the reference potential, one reference value signal is set equal to the reference potential. As a result, the amplitude of the coil current does not decrease and hence increase of the switching frequency is suppressed. High-frequency noise can thus be reduced. Still further, switching to a critical-mode control method can be made easily by setting the control signal lower than the reference potential. This facilitates design change and hence enables reduction of the development cost.

DETAILED DESCRIPTION OF THE INVENTION

Figure 1:
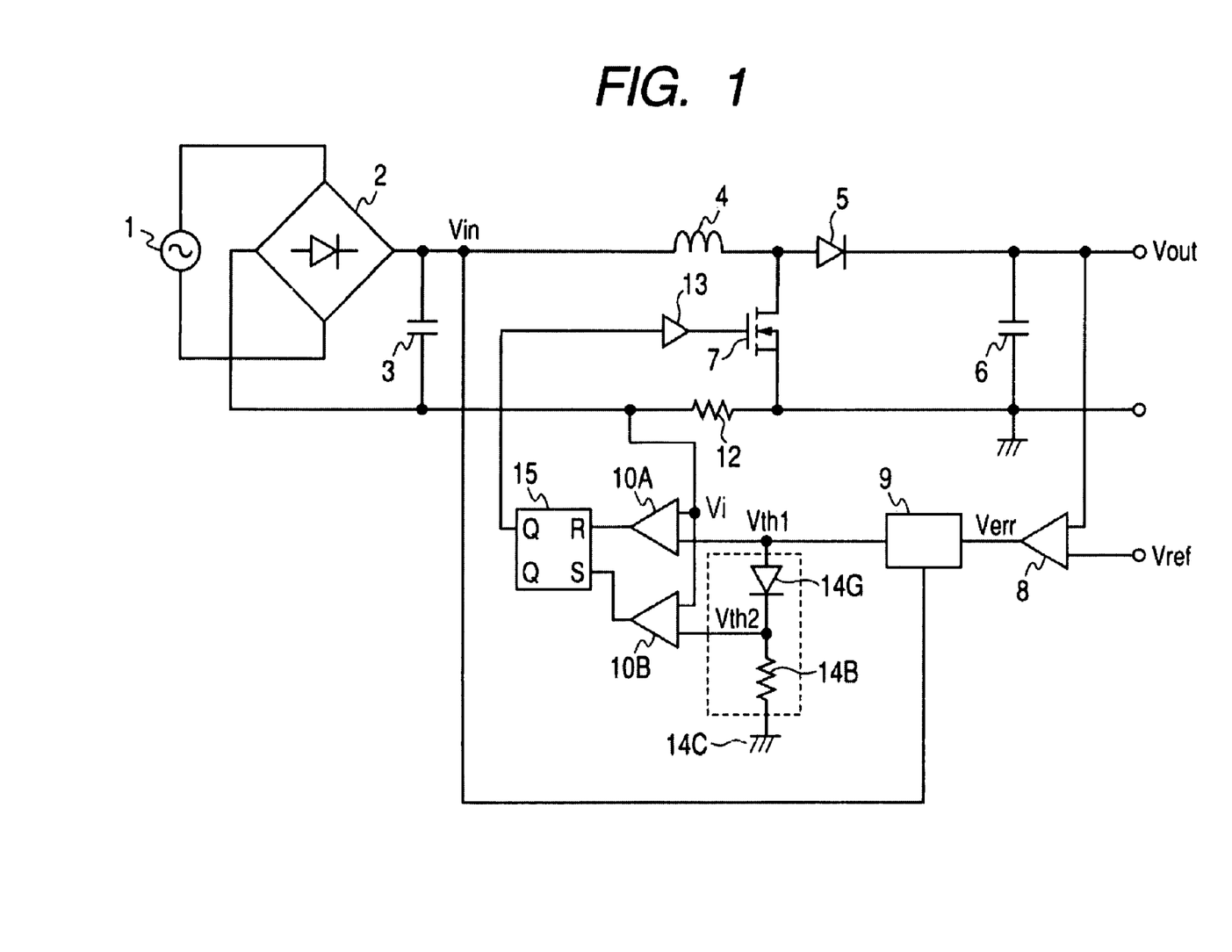
FIG. 1 is a circuit diagram showing the configuration of a switching power source according to an embodiment of the present invention.

FIG. 1 is a circuit diagram of a switching power source according to an embodiment of the present invention. This is an improved version of the switching power source of FIG. 11, and the same components as shown in FIG. 11 will not be described in detail by giving them the same reference symbols as the corresponding components in FIG. 11. For example, in the switching power source of FIG. 1 a series circuit of a diode 14G and a resistor 14B is provided in such a manner that a first threshold value signal Vth1 (which corresponds to the threshold signal Vth in FIG. 11) and a reference potential 14C are applied to the diode 14G and the resistor 14B, respectively, that two comparators 10A and 10B are provided in place of the comparator 10 shown in FIG. 11, and a flip-flop 15 is provided in place of the monostable multivibrator 11 shown in FIG. 11. These different points will be described mainly below.

The voltage error amplifier 8 amplifies an error of the output voltage Vout with respect to the reference voltage Vref and gives an amplified error voltage Verr to the multiplier 9. The multiplier 9 multiplies the error voltage Verr and the input voltage Vin together, whereby a first threshold value signal Vth1 is generated which is in phase with, and similar in waveform to, the input voltage Vin and is proportional in amplitude to the error voltage Verr. These operations are the same as in the switching power source of FIG. 11. A second threshold value signal Vth2 develops across the resistor 14B, which is connected between the reference potential 14C and the cathode of the diode 14G to the anode of which the first threshold value signal Vth1 is applied. Alternatively, a second threshold value signal Vth2 may be generated by a circuit in which a resistor is connected in series to a parallel circuit of a diode and a resistor (not shown).

A current flowing through the inductor 4 is converted into a current detection signal Vi by a current detection circuit 12 including a resistor. The current detection signal Vi is compared with the first threshold value signal Vth1 by the comparator 10A and with the second threshold value signal Vth2 by the comparator 10B. An output of the comparator 10A is input to the reset terminal of the flip-flop 15, and an output of the comparator 10B is input to the set terminal of the flip-flop 15. An output of the flip-flop 15 is input to the drive circuit 13. The drive circuit 13 turns on the switching element 7 when its input turns to the high level, and turns off the switching element 7 when its input turns to the low level. Equipped with a lowpass filter (not shown), the current detection circuit 12 prevents harmonic components from being included in the current detection signal Vi. Only low-frequency components are supplied to the comparators 10A and 10B.

With the above configuration, when the switching element 7 is turned on, a current flowing through the inductor 4 increases and the current detection signal Vi rises. When the current detection signal Vi exceeds the first threshold value signal Vth1, the output of the comparator 10A turns to the high level, whereby the flip-flop 15 is reset. The output of the flip-flop 15 turns to the low level, whereby the switching element 7 is turned off via the drive circuit 13. As a result, the current coming from the inductor 4 decreases gradually. When the current detection signal Vi becomes lower than the second threshold value signal Vth2, the output of the comparator 10B turns to the high level and the flip-flop 15 is set. The output of the flip-flop 15 turns to the high level, whereby the switching element 7 is turned on via the drive circuit 13.

Figure 2A:
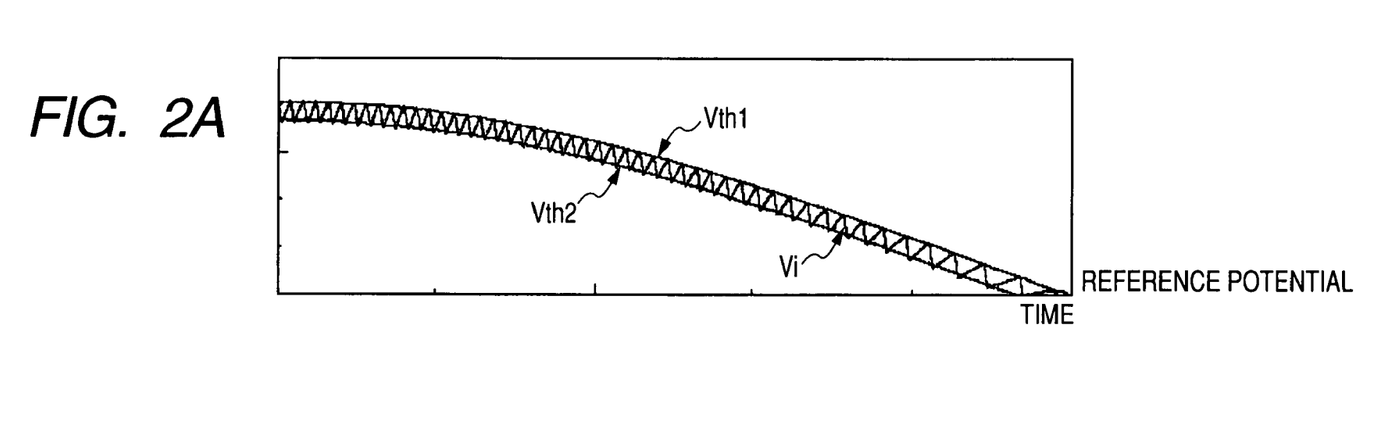
FIGS. 2A and 2B illustrate an operation of the conventional switching power source of FIG. 1.
Figure 2B:
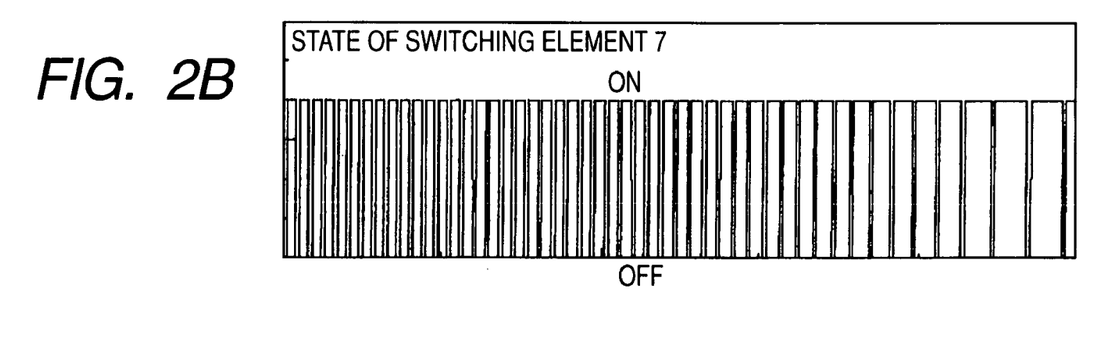

FIGS. 2A and 2B illustrate the operation of the switching power source of FIG. 1 in which control is made so that peaks of the current detection signal Vi (which corresponds to the current flowing through the inductor 4) coincide with the first threshold value signal Vth1 which is in phase with and similar, in waveform, to the input voltage Vin and that its bottoms coincide with the second threshold value signal Vth2 which is in phase with and similar, in waveform, to the input voltage Vin. As a result, the noise spectrum is spread and noise reduction is enabled. FIG. 2A illustrates a relationship among the first and second threshold value signals Vth1 and Vth2 and the current detection signal Vi, and FIG. 2B shows an on/off waveform of the switching element 7.

As shown in FIGS. 13A and 13B, where the second threshold value signal Vth2 varies in proportion to the first threshold value signal Vth1, the input voltage Vin which is a full-wave-rectified voltage of an AC power source voltage varies with time and accordingly the first threshold value signal Vth1 varies between the reference potential and a peak potential. When the first threshold value signal Vth1 is around the reference potential, the second threshold value signal Vth2 is also small and the difference between the first threshold value signal Vth1 and the second threshold value signal Vth2 is small. The amplitude of the coil current becomes small and the switching frequency becomes very high, resulting in a problem that noise and switching loss are increased.

In contrast, in the switching power source of FIG. 1, the second threshold value signal Vth2 is the voltage at the connecting point of the diode 14G and the resistor 14B to which the first threshold value signal Vth1 and the reference potential 14C are applied, respectively, and hence is lower than the first threshold value signal Vth1 by the forward voltage of the diode 14G. That is, the difference between the first threshold value signal Vth1 and the second threshold value signal Vth2 can be kept approximately constant (see FIG. 2A). Even when the first threshold value signal Vth1 is around the reference potential, the amplitude of the coil current does not become small and the switching frequency is not increased. Increase of noise and switching loss can thus be prevented.

Figure 3:
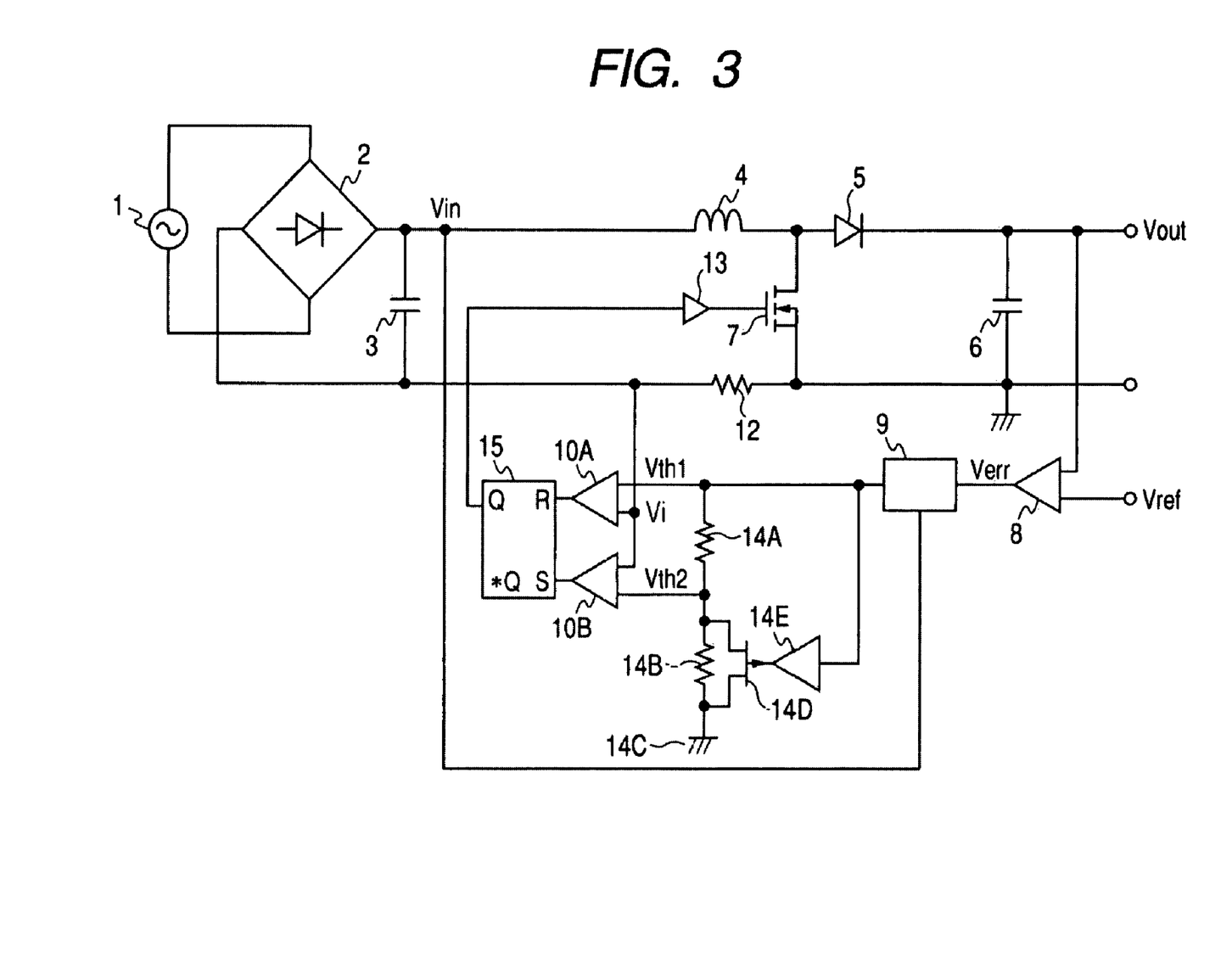
FIG. 3 is a circuit diagram showing the configuration of a switching power source according to another embodiment of the invention.

FIG. 3 shows a switching power source according to another embodiment of the invention. This switching power source is the same as that of FIG. 1 except for the following. A series circuit of a first resistor 14A and a second resistor 14B is provided in such a manner that the first threshold value signal Vth1 and the reference potential 14C are applied to the first resistor 14A and the second resistor 14B, respectively. In addition, a transistor 14D is connected to both ends of the resistor 14B and a drive circuit 14E for driving the transistor 14D is provided. The voltage error amplifier 8 amplifies an error of the output voltage Vout with respect to the reference voltage Vref and gives an amplified error voltage Verr to the multiplier 9. The multiplier 9 multiplies the error voltage Verr and the input voltage Vin together, whereby a first threshold value signal Vth1 is generated which is in phase with and similar, in waveform, to the input voltage Vin and is proportional, in amplitude, to the error voltage Verr. These operations are the same as in the switching power source of FIG. 1.

The first threshold value signal Vth1 is divided by the resistors 14A and 14B to which the first threshold value signal Vth1 and the reference potential 14C are applied, respectively, whereby a second threshold value Vth2 is generated which is proportional to the first threshold value signal Vth1. The transistor 14D, which is a p-channel FET, for example, is connected to both ends of the resistor 14B and the gate of the transistor 14D is connected to the transistor drive circuit 14E. The transistor drive circuit 14E outputs an amplified signal of the first threshold value signal Vth1 to the transistor 14D.

A current flowing through the inductor 4 is converted into a current detection signal Vi by the current detection circuit 12 including a resistor. The current detection signal Vi is compared with the first threshold value signal Vth1 by the comparator 10A and with the second threshold value signal Vth2 by the comparator 10B. An output of the comparator 10A is input to the reset terminal (R) of the flip-flop 15, and an output of the comparator 10B is input to the set terminal (S) of the flip-flop 15. An output of the flip-flop 15 is input to the drive circuit 13. The drive circuit 13 turns on the switching element 7 when its input turns to the high level, and turns off the switching element 7 when its input turns to the low level.

With the above configuration, when the switching element 7 is turned on, a current flowing through the inductor 4 increases and the current detection signal Vi rises. When the current detection signal Vi exceeds the first threshold value signal Vth1, the output of the comparator 10A turns to the high level, whereby the flip-flop 15 is reset. The output of the flip-flop 15 turns to the low level, whereby the switching element 7 is turned off via the drive circuit 13. As a result, the current coming from the inductor 4 decreases gradually. When the current detection signal Vi becomes lower than the second threshold value signal Vth2, the output of the comparator 10B turns to the high level and the flip-flop 15 is set. The output of the flip-flop 15 turns to the high level, whereby the switching element 7 is turned on via the drive circuit 13.

When the first threshold value signal Vth1 is large, the output of the transistor drive circuit 14E is large and hence the transistor 14D is rendered insulative. The second threshold value signal Vth2 has a value that is determined by the voltage division ratio of the resistors 14A and 14B. As the first threshold value signal Vth1 decreases, the transistor 14D makes a transition from the insulative state to a conductive state and the second threshold value signal Vth2 decreases accordingly. When the first threshold value signal Vth1 decreases further, the transistor 14D is rendered conductive and the second threshold value signal Vth2 becomes approximately equal to the reference potential 14C.

Figure 4A:
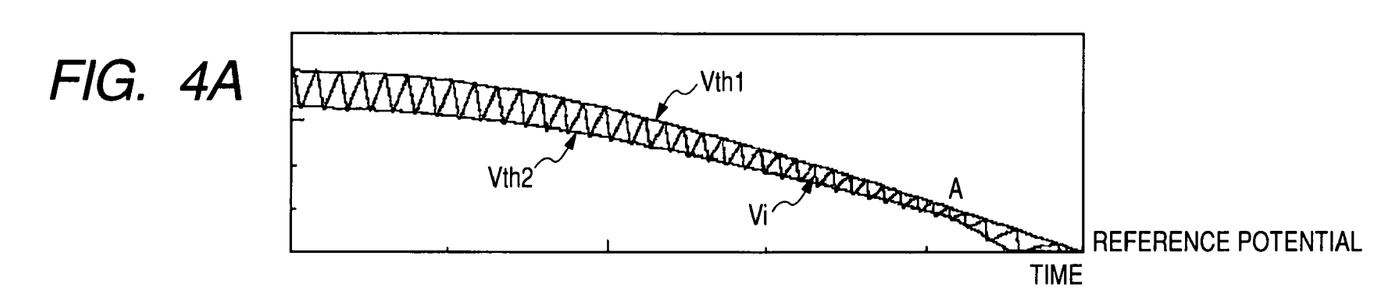
FIGS. 4A and 4B illustrate an operation of the switching power source of FIG. 3.
Figure 4B:
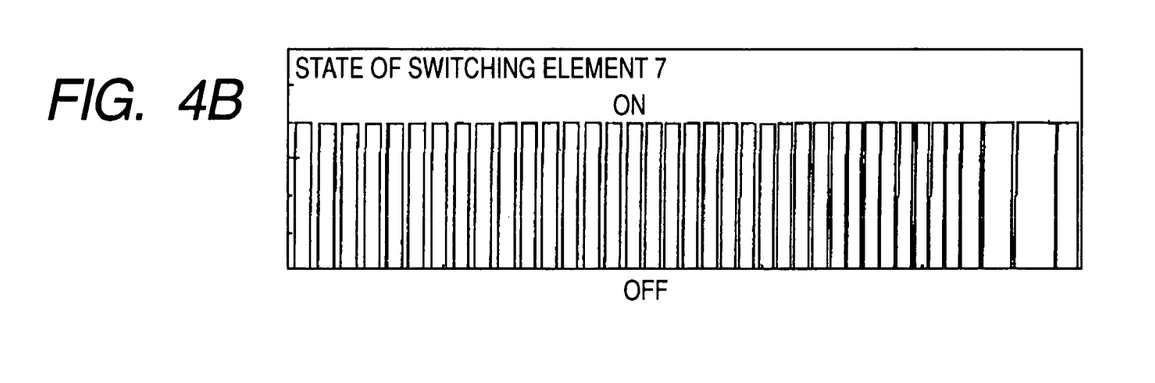

FIGS. 4A and 4B illustrate the operation of the switching power source of FIG. 3 in which control is made so that peaks of the current detection signal Vi (which corresponds to the current flowing through the inductor 4) coincide with the first threshold value signal Vth1 which is in phase with and similar, in waveform, to the input voltage Vin and that its bottoms coincide with the second threshold value signal Vth2 which is in phase with and similar, in waveform, to the input voltage Vin. Even when the first threshold value signal Vth1 decreases past point A, the difference between the first threshold value signal Vth1 and the second threshold value signal Vth2 does not diminish. Therefore, the amplitude of the coil current does not decrease and the upper limit of the switching frequency is set low. Increase of noise and switching loss can thus be suppressed. FIG. 4A illustrates a relationship among the first and second threshold value signals Vth1 and Vth2 and the current detection signal Vi, and FIG. 4B shows an on/off waveform of the switching element 7.

Figure 5:
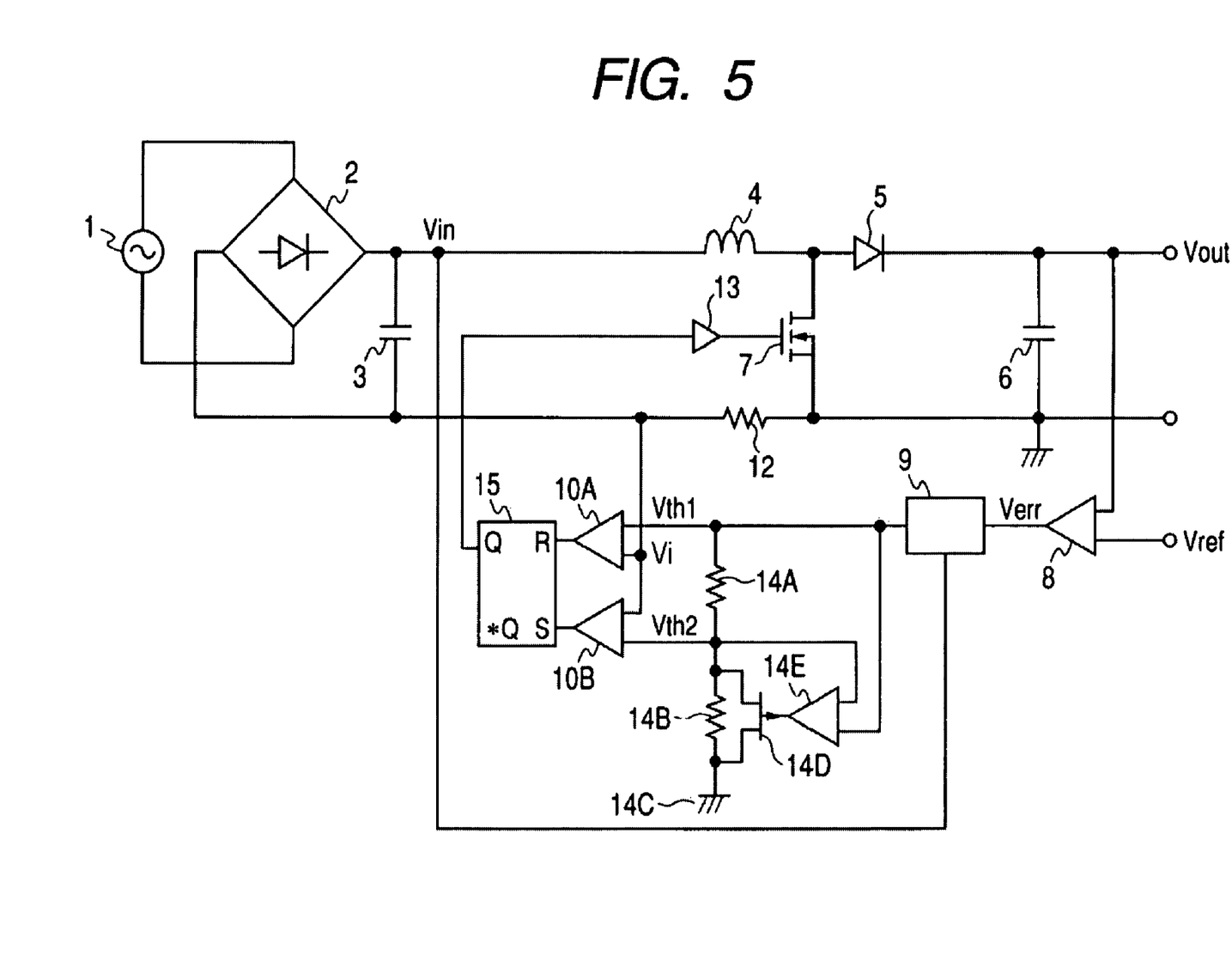
FIG. 5 is a circuit diagram showing the configuration of a switching power source according to a first modification of the embodiment of FIG. 3.

FIG. 5 shows a switching power source according to a first modification of the embodiment of FIG. 3. This switching power source is different from that of FIG. 3 in that the transistor drive circuit 14E amplifies the difference between the first threshold value signal Vth1 and the second threshold value signal Vth2 and drives the transistor 14D on the basis of the amplified difference. With this configuration, when the amplitude of the coil current decreases, the transistor 14D is rendered conductive, which counteracts the decreasing coil current amplitude. The upper limit of the switching frequency is set low, and increase of noise and switching loss can thus be suppressed.

Figure 6:
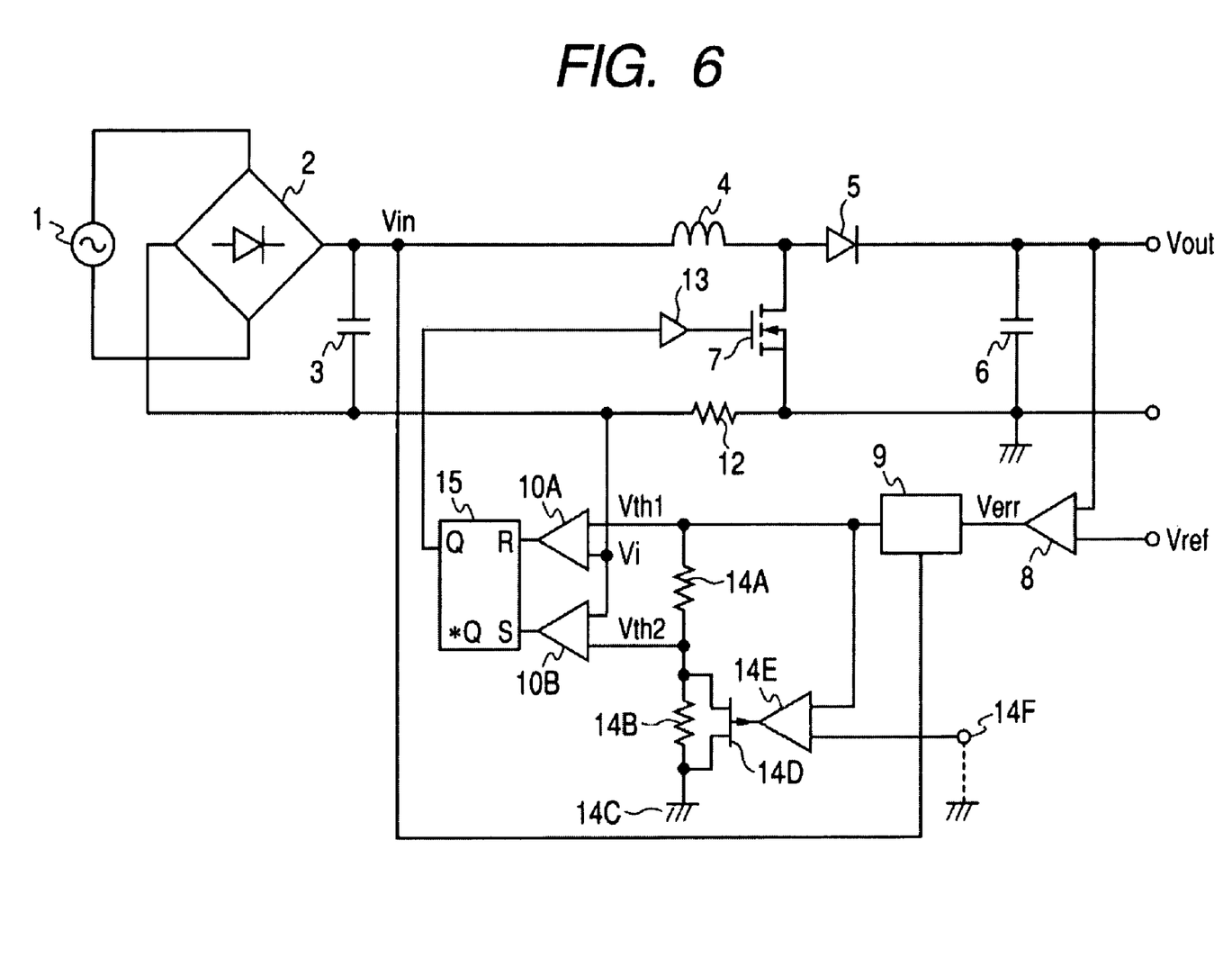
FIG. 6 is a circuit diagram showing the configuration of a switching power source according to a second modification of the embodiment of FIG. 3.

FIG. 6 shows a switching power source according to a second modification of the embodiment of FIG. 3. As seen from FIG. 6, this switching power source is different from that of FIG. 3 in that a control signal (selection signal) 14F is supplied to the transistor drive circuit 14E. In this switching power source, when a potential that is lower than the reference potential 14C is input to the transistor drive circuit 14E as a control signal 14F, the transistor 14D is rendered conductive, whereby the second threshold value signal Vth2 is always fixed to the reference potential 14C. A critical-mode control in which the coil current is zero and the switching element 7 is on is thereby performed, and noise reduction is attained.

Figure 7:
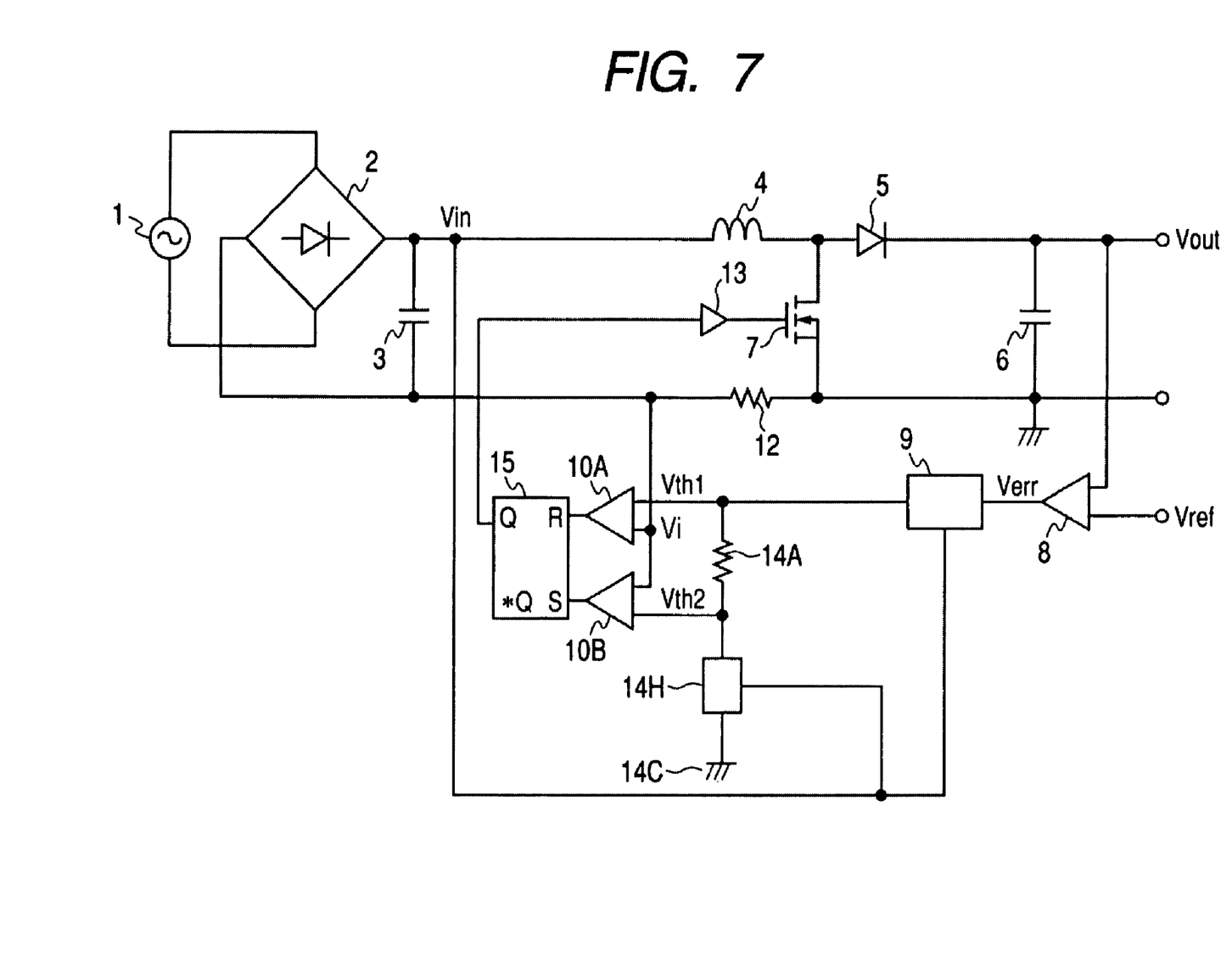
FIG. 7 is a circuit diagram showing the configuration of a switching power source according to a further embodiment of the invention.

FIG. 7 shows a switching power source according to a further embodiment of the invention. The same components as in the above embodiments and modifications will not be described in detail by giving them the same reference symbols as the corresponding components in the above embodiments and modifications. An output voltage of the AC power source 1 is full-wave-rectified by the rectification circuit 2, which is a diode bridge. High frequency noise is removed from a rectified voltage by the capacitor 3 (input voltage Vin), and a current is supplied to the capacitor 6 via the inductor 4 and the diode 5, whereby a smoothed DC voltage Vout is obtained. Connected to the connecting point of the inductor 4 and the diode 5, the switching element 7 such as a MOSFET shunts, when being on, the current flowing from the inductor 4 to the diode 5.

The voltage error amplifier 8 amplifies an error of the output voltage Vout with respect to a reference voltage Vref and gives an amplified error voltage Verr to the multiplier 9. The multiplier 9 multiplies the error voltage Verr and the input voltage Vin together, whereby a first threshold value signal Vth1 is generated which is in phase with and similar, in waveform, to the input voltage Vin and is proportional, in amplitude, to the error voltage Verr. The first threshold value signal Vth1 is divided by a series connection of a resistor 14A and a variable resistor 14H to which the first threshold value signal Vth1 and the reference potential 14C are applied, respectively, whereby a second threshold value signal Vth2 is generated which is based on the first threshold value signal Vth1. The variable resistor 14H is such that its resistance is varied according to the magnitude of the input voltage Vin (described later in detail).

A current flowing through the inductor 4 is converted into a current detection signal Vi by a current detection circuit 12 including a current detection resistor 12A. The current detection signal Vi is compared with the first threshold value signal Vth1 by the comparator 10A and with the second threshold value signal Vth2 by the comparator 10B. An output of the comparator 10A is input to the reset terminal of the flip-flop 15, and an output of the comparator 10B is input to the set terminal of the flip-flop 15. An output of the flip-flop 15 is input to the drive circuit 13. The drive circuit 13 turns on the switching element 7 when its input turns to the high level, and turns off the switching element 7 when its input turns to the low level.

With the above configuration, when the switching element 7 is turned on, a current flowing through the inductor 4 increases and the current detection signal Vi rises. When the current detection signal Vi exceeds the first threshold value signal Vth1, the output of the comparator 10A turns to the high level, whereby the flip-flop 15 is reset. The output Q of the flip-flop 15 turns to the low level, whereby the switching element 7 is turned off via the drive circuit 13. As a result, the current coming from the inductor 4 decreases gradually. When the current detection signal Vi becomes lower than the second threshold value signal Vth2, the output of the comparator 10B turns to the high level and the flip-flop 15 is set. The output Q of the flip-flop 15 turns to the high level, whereby the switching element 7 is turned on via the drive circuit 13.

Figure 9:
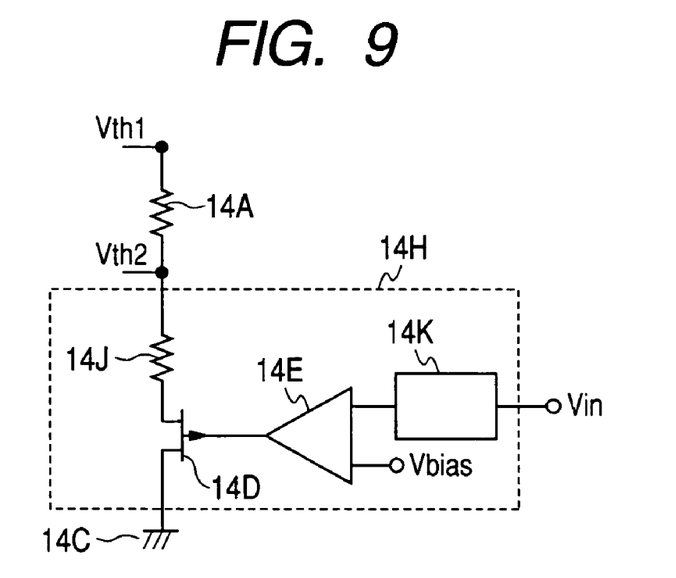
FIG. 9 is a circuit diagram showing the configuration of a specific example of a variable resistor used in the switching power source of FIG. 7.

FIG. 9 is a detailed circuit diagram of the variable resistor 14H. A resistor 14J is connected to the resistor 14A. A drain terminal of a transistor 14D is connected to the resistor 14J and a source terminal of the transistor 14D is supplied with the reference potential 14C. A gate terminal of the transistor 14D is connected to a transistor drive circuit 14E. The transistor drive circuit 14E generates a transistor drive signal from a bias voltage Vbias and an output of a peak voltage detection circuit 14K for detecting a peak of the input voltage Vin, and outputs it to the transistor 14D. It is preferable that the transistor 14D be a linear device such as an n-channel FET. The on-resistance of the n-channel FET can be used as a variable resistor by using the n-channel FET in a linear range.

The bias voltage Vbias is set at such a value that the transistor drive circuit 14E can output a voltage that does not turn off the transistor 14D even if the peak voltage of the input voltage Vin is small. When the peak voltage of the input voltage Vin is large, the transistor drive circuit 14E outputs so large a voltage that the transistor 14D is rendered in a low-resistance state. The transistor drive circuit 14E is an operational amplifier, for example. The second threshold value signal Vth2 has a value that is determined by the voltage division ratio of the resistor 14A and the variable resistor 14H. However, when the input voltage Vin is high and its peak voltage is large, the output of the transistor drive circuit 14E is large and the transistor 14D is rendered in a low-resistance state. The ratio of the second threshold value signal Vth2 to the first threshold value signal Vth1 becomes small.

In the example of FIG. 9, the variable resistor 14H is the series circuit of the resistor 14J and the transistor 14D. However, where the transistor 14D has a wide linear range and a desired range of the ratio of the second threshold value signal Vth2 to the first threshold value signal Vth1 can be obtained, the resistor 14J can be omitted. A small-size transistor can be used as the transistor 14D by determining a minimum necessary ratio of the second threshold value signal Vth2 to the first threshold value signal Vth1 by the resistors 14A and 14J and producing a variable component by the transistor 14D. This is advantageous in terms of cost.

Figure 8A:
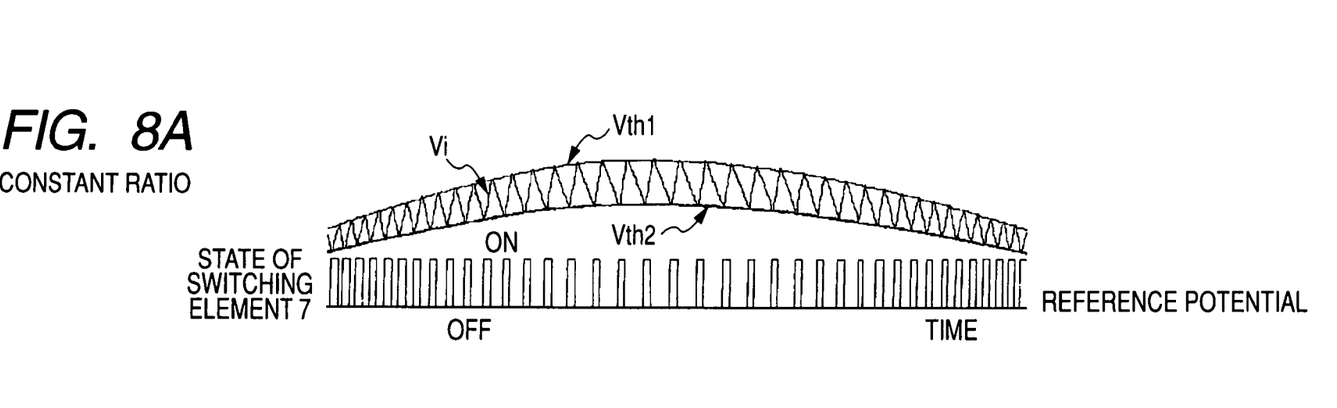
FIGS. 8A and 8B illustrate an operation of the switching power source of FIG. 7.
Figure 8B:
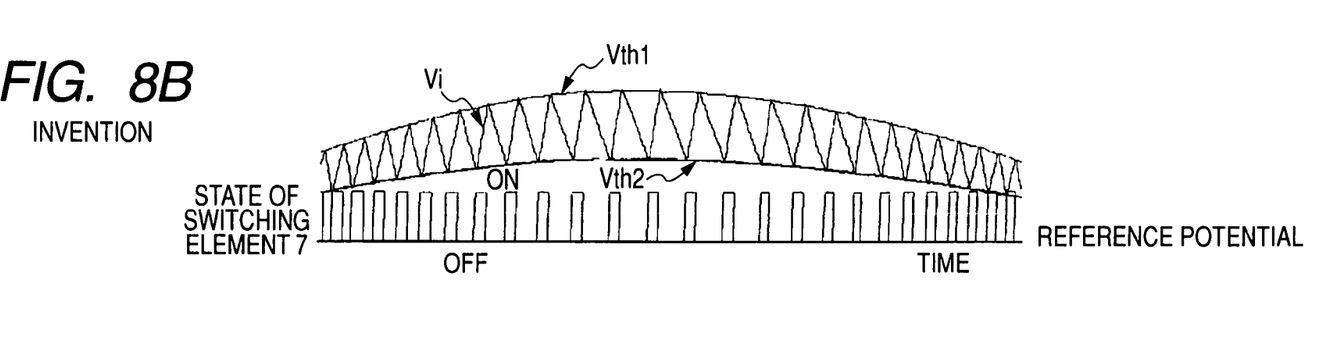

FIGS. 8A and 8B illustrate the operation of the switching power source of FIG. 7 in which control is made so that peaks of the current detection signal Vi (which corresponds to the current flowing through the inductor 4) coincide with the first threshold value signal Vth1 which is in phase with and similar, in waveform, to the input voltage Vin and that its bottoms coincide with the second threshold value signal Vth2. The range of the ratio of the second threshold value signal Vth2 to the first threshold value signal Vth1 is wider than the case of a constant voltage division ratio. Therefore, the amplitude of the current flowing through the inductor 4 becomes large and increase of the switching frequency is suppressed. Increase of noise and switching loss can thus be suppressed.

Figure 10:
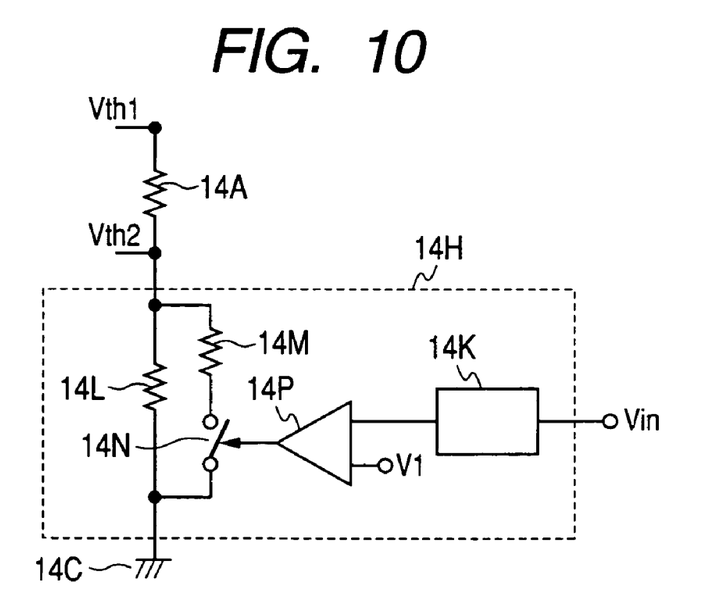
FIG. 10 is a circuit diagram showing the configuration of another specific example of the variable resistor used in the switching power source of FIG. 7.

FIG. 10 is a circuit diagram showing the configuration of another specific example of the variable resistor 14H shown in FIG. 7. In FIG. 10, components having the same components in FIG. 9 are given the same reference symbols as the latter. This variable resistor 14H is different from that of FIG. 9 in that a series connection of a resistor 14M and a switch 14N is connected in parallel to a resistor 14L and this parallel connection is connected in series to the resistor 14A. The other end of the parallel connection is connected to the reference potential 14C. The switch 14N is connected to a judgment circuit 14P. The judgment circuit 14P compares the output of the peak voltage detection circuit 14K of the input voltage Vin with a prescribed voltage V1 and outputs an on/off signal to the switch 14N.

With the above configuration, when the peak voltage of the input voltage Vin is large, the switch 14N is turned on, whereby the ratio of the second threshold value signal Vth2 to the first threshold value signal Vth1 is decreased. When the peak voltage of the input voltage Vin is small, the switch 14N is turned off, whereby the ratio of the second threshold value signal Vth2 to the first threshold value signal Vth1 is increased. The amplitude of the coil current is made approximately constant by varying voltage division ratio according to the input voltage Vin in this manner, whereby increase of the switching frequency is suppressed. Increase of noise and switching loss can thus be suppressed.

In the above examples, the resistance of the variable resistor 14H is varied by controlling the transistor or switch according to the input voltage Vin. It is also possible to vary the resistance of the variable resistor 14H by controlling a transistor or switch according to the peak value of the current flowing through the inductor 4, the peak value of the first threshold value signal Vth1 as a command value of the current flowing through the inductor 4, or the error voltage Verr. Furthermore, plural sets of a resistor and a transistor or plural sets a resistor and a switch may be connected to each other in parallel to constitute the variable resistor 14H. This makes it possible to accommodate a number of input voltage conditions and load conditions.

It will of course be appreciated that the invention may be practiced otherwise than as specifically disclosed herein without departing from the scope of the invention.

What is claimed is:

1. A switching power source comprising:
a rectification circuit configured to produce a pulsating output by full-wave-rectifying an AC power source voltage;
a chopper circuit, including an inductor connected to the rectification circuit, a switching element that shunts when switched on, a current flowing through the inductor, and a capacitor configured to produce a DC output by smoothing a current supplied from the inductor;
a first signal generator configured to generate a first threshold value signal that is in phase with, and similar in waveform to, an input voltage of the chopper circuit, and is proportional in amplitude to an error of an output voltage of the chopper circuit;
a second signal generator configured to generate a second threshold value signal approximately proportional in amplitude to the first threshold value signal;
a current detector configured to detect the current flowing through the inductor; and
a switching control configured to turn off the switching element when a current detection value of the current detector reaches a level of the first threshold value signal, and to turn on the switching element when the current detection value becomes lower than a level of the second threshold value signal.

2. The switching power source according to claim 1, wherein the second signal generator is a series circuit of a diode and a first resistor to which the first threshold value signal and a reference potential are applied respectively, or a series circuit of a first resistor and a parallel circuit of a diode and another resistor, the first threshold value signal and the reference potential being applied to the first resistor and the parallel circuit, respectively, and an output at a connecting point of the first resistor and the diode or the parallel circuit serves as the second threshold value signal.

3. The switching power source according to claim 1, wherein the second signal generator is a series circuit of a resistor and a variable resistor to which the first threshold value signal and a reference potential are applied, respectively, and an output at a connecting point of the resistor and the variable resistor serves as the second threshold value signal.

4. The switching power source according to claim 3, wherein the variable resistor comprises at least one series circuit of a resistor and a transistor, and the transistor is driven by at least one of the input voltage, the current flowing through the inductor, and the output voltage error.

5. The switching power source according to claim 3, wherein the variable resistor comprises at least one series circuit of a resistor and a switch or a parallel circuit of plural series circuits of a resistor and a switch, and the switch is turned on and off by at least one of the input voltage, the current flowing through the inductor, and the output voltage error.

6. A switching power source comprising:
a rectification circuit configured to produce a pulsating output by full-wave-rectifying an AC power source voltage;
a chopper circuit including an inductor connected to the rectification circuit, a switching element that shunts, when switched on, a current flowing through the inductor, and a capacitor configured to produce a DC output by smoothing a current supplied from the inductor;
a first signal generator configured to generate a first threshold value signal which is in phase with, and similar in waveform to, an input voltage of the chopper circuit and is proportional in amplitude to an error of an output voltage of the chopper circuit;
a second signal generator configured to generate a second threshold value signal that is proportional to the first threshold value signal;
a modulator configured to modulate the second threshold value signal;
a current detector configured to detect the current flowing through the inductor; and
a switching control configured to turn off the switching element when a current detection value of the current detector reaches a level of the first threshold value signal, and to turn on the switching element when the current detection value becomes lower than a level of the second threshold voltage signal.

7. The switching power source according to claim 6, wherein the second signal generator is a series circuit of a first resistor and a second resistor to which the first threshold value signal and a reference potential are applied respectively, and an output at a connecting point of the first resistor and the second resistor serves as the second threshold value signal.

8. The switching power source according to claim 6, wherein the modulator comprises a transistor, to which the second threshold value signal and a reference potential are applied, and a drive circuit configured to drive the transistor on the basis of the first threshold value signal.

9. The switching power source according to claim 6, wherein the modulator comprises a transistor, to which the second threshold value signal and a reference potential are applied, and a drive circuit configured to drive the transistor on the basis of a difference between the first threshold value signal and the second threshold value signal.

10. The switching power source according to claim 6, wherein the modulator comprises a transistor, to which the second threshold value signal and a reference potential are applied, and a drive circuit configured to drive the transistor on the basis of a difference between the first threshold value signal and a control signal.

* * * * *